United States Patent
Weinberger et al.

(10) Patent No.: US 10,979,391 B2
(45) Date of Patent: *Apr. 13, 2021

(54) CYBER THREAT ATTENUATION USING MULTI-SOURCE THREAT DATA ANALYSIS

(71) Applicant: Cyber adAPT, Inc., Half Moon Bay, CA (US)

(72) Inventors: Michael Weinberger, Dallas, TX (US); Devin Jones, Moss Beach, CA (US); Scott E. Millis, Frisco, TX (US); J. Kirsten Bay, Half Moon Bay, CA (US)

(73) Assignee: Cyber adAPT, Inc., Half Moon Bay, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/395,248

(22) Filed: Apr. 26, 2019

(65) Prior Publication Data

US 2019/0260710 A1    Aug. 22, 2019

Related U.S. Application Data

(63) Continuation of application No. 15/867,696, filed on Jan. 11, 2018, now Pat. No. 10,454,894, which is a
(Continued)

(51) Int. Cl.
*H04L 29/06* (2006.01)
*G06F 21/53* (2013.01)
*G06F 21/55* (2013.01)

(52) U.S. Cl.
CPC ......... *H04L 63/0236* (2013.01); *G06F 21/53* (2013.01); *G06F 21/552* (2013.01);
(Continued)

(58) Field of Classification Search
None
See application file for complete search history.

(56) References Cited

U.S. PATENT DOCUMENTS

| 6,279,113 B1 | 8/2001 | Vaidya |
| 7,681,235 B2 | 3/2010 | Chesla et al. |

(Continued)

FOREIGN PATENT DOCUMENTS

EP    1887754 B1    2/2008

OTHER PUBLICATIONS

Office Action dated Mar. 28, 2014, U.S. Appl. No. 13/693,226, filed Dec. 4, 2012.

(Continued)

*Primary Examiner* — Kambiz Zand
*Assistant Examiner* — Arezoo Sherkat

(57) ABSTRACT

A cyber threat attenuation system. The system comprises a cyber threat data store, a plurality of sensor control points (SCPs), wherein at least one SCP is located in each local area network (LAN) segment of an enterprise network, and an analytics correlation system (ACS). Each SCP comprises a plurality of sensor applications that analyze data packets transported by the LAN segment in which the SCP is located and transmits a notification identifying the transmitting sensor, an identity of the source of the data packet, an identity of the destination of the data packet, and a notification reason to the data store. The ACS comprises an application that determines unusual data packet traffic in the enterprise network and transmits a notification comprising information about the unusual data packet traffic and an identity of a host computer associated with the unusual data packet traffic to the data store.

18 Claims, 5 Drawing Sheets

Related U.S. Application Data continuation of application No. 14/943,973, filed on Nov. 17, 2015, now Pat. No. 9,894,036.

(52) U.S. Cl.
CPC ...... *H04L 63/0263* (2013.01); *H04L 63/1408* (2013.01); *H04L 63/1441* (2013.01); *G06F 2221/033* (2013.01)

(56) References Cited

U.S. PATENT DOCUMENTS

| | | |
|---|---|---|
| 7,779,119 B2 | 8/2010 | Ginter et al. |
| 8,321,938 B2 | 11/2012 | Strayer et al. |
| 8,341,740 B2 | 12/2012 | Abdel-Aziz et al. |
| 8,402,543 B1 | 3/2013 | Ranjan et al. |
| 8,528,086 B1 | 9/2013 | Aziz |
| 8,607,353 B2 | 12/2013 | Rippert, Jr. et al. |
| 8,779,921 B1 | 7/2014 | Curtiss |
| 9,008,080 B1 | 4/2015 | Mehta et al. |
| 9,026,840 B1 | 5/2015 | Kim |
| 9,165,454 B2 | 10/2015 | Inagaki et al. |
| 9,401,932 B2 | 7/2016 | Deerman et al. |
| 9,407,509 B2 | 8/2016 | Porras et al. |
| 9,565,202 B1 | 2/2017 | Kindlund et al. |
| 9,894,036 B2 | 2/2018 | Weinberger et al. |
| 10,044,736 B1 | 8/2018 | Barger et al. |
| 2006/0067220 A1 | 3/2006 | Poletto et al. |
| 2007/0192863 A1 | 8/2007 | Kapoor et al. |
| 2008/0028467 A1* | 1/2008 | Kommareddy ..... H04L 63/1458 726/23 |
| 2008/0262990 A1* | 10/2008 | Kapoor ............... H04L 63/1408 706/20 |
| 2008/0262991 A1* | 10/2008 | Kapoor .................. H04L 63/14 706/20 |
| 2010/0138535 A1 | 6/2010 | Jerrim et al. |
| 2010/0202299 A1 | 8/2010 | Strayer et al. |
| 2011/0214157 A1* | 9/2011 | Korsunsky .......... H04L 63/1441 726/1 |
| 2011/0231564 A1* | 9/2011 | Korsunsky .......... H04L 63/1483 709/231 |
| 2011/0238855 A1 | 9/2011 | Korsunsky et al. |
| 2012/0240108 A1 | 9/2012 | Baraldi et al. |
| 2014/0157405 A1* | 6/2014 | Joll ..................... H04L 63/1425 726/22 |
| 2014/0201806 A1 | 7/2014 | Kumar |
| 2014/0245374 A1* | 8/2014 | Deerman .................. F01D 3/04 726/1 |
| 2015/0200962 A1 | 7/2015 | Xu et al. |
| 2018/0139181 A1 | 5/2018 | Weinberger et al. |

OTHER PUBLICATIONS

Final Office Action dated Jun. 30, 2014, U.S. Appl. No. 13/693,226, filed Dec. 4, 2012.
Office Action dated Apr. 21, 2016, U.S. Appl. No. 13/693,226, filed Dec. 4, 2012.
Office Action dated Jul. 30, 2015, U.S. Appl. No. 14/147,105, filed Jan. 3, 2014.
Final Office Action dated Feb. 17, 2016, U.S. Appl. No. 14/147,105, filed Jan. 3, 2014.
Notice of Allowance dated Jul. 27, 2016, U.S. Appl. No. 14/147,105, filed Jan. 3, 2014.
Office Action dated May 3, 2017, U.S. Appl. No. 14/943,973, filed Nov. 17, 2015.
Notice of Allowance dated Oct. 4, 2017, U.S. Appl. No. 14/943,973, filed Nov. 17, 2015.
"Address Resolution Protocol", Wikipedia, https://en.wikipedia.org/wiki/Address_Resolution_Protocol.
"Advanced persistent threat", Wikipedia, https://en.wikipedia.org/wiki/Advanced_persistent_threat.
"Exploit (computer security)", Wikipedia, https://en.wikipedia.org/wiki/Exploit_(computer_security).
"Internet Control Message Protocol", Wikipedia, https://en.wikipedia.org/wiki/Internet_Control_Message_Protocol.
"Man-in-the-middle attack", Wikipedia, https://en.wikipedia.org/wiki/Man-in-the-middle_attack.
"Network Behavior Anomaly Detection", Wikipedia, https://en.wikipedia.org/wiki/Network_Behavior_Anomaly_Detection.
McMillan, Jim, "IDFAQ: What is the Difference Between an IPS and a Web Application Firewall?", Nov. 2009, https://www.sans.org/security-resources/idfaq/what-is-the-difference-between-an-ips-and-a-web-application-firewall/1/25.
"Security information and event management", Wikipedia, https://en.wikipedia.org/wiki/Security_information_and_event_management.
Office Action dated Oct. 1, 2018, U.S. Appl. No. 15/867,696, filed Jan. 11, 2018.
Notice of Allowance dated Jan. 28, 2019, U.S. Appl. No. 15/867,696, filed Jan. 11, 2018.

* cited by examiner

US 10,979,391 B2

CYBER THREAT ATTENUATION USING MULTI-SOURCE THREAT DATA ANALYSIS

CROSS-REFERENCE TO RELATED APPLICATIONS

This application is a continuation of and claims priority under 35 U.S.C. § 120 to U.S. patent application Ser. No. 15/867,696 filed on Jan. 11, 2018, entitled "Cyber Threat Attenuation Using Multi-Source Threat Data Analysis," by Michael Weinberger, et al., which is a continuation of and claims priority to U.S. Pat. No. 9,894,036 issued on Feb. 13, 2018 and entitled "Cyber Threat Attenuation Using Multi-Source Threat Data Analysis," by Michael Weinberger, both of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

We hear of major cyber crimes being committed too often. Large retail outlets are hacked, credit cards are exposed, millions of dollars in losses are sustained by financial institutions. In addition to readily quantifiable monetary losses, the brand values of enterprises that have been victimized by a highly publicized cyber attack may suffer damage. Government organizations are being hacked and masses of confidential information are pilfered. Cyber attacks and cyber criminals are becoming increasingly sophisticated and the stakes in play are increasing in value.

SUMMARY

In an embodiment, a cyber threat attenuation system is disclosed. The cyber threat attenuation system comprises a cyber threat data store, a network data traffic data store that stores expected values of data traffic volumes and measures of data traffic volume variabilities for hosts in each of a plurality of LAN segments of an enterprise network and stores host data traffic volume information, and a user interface. The system further comprises a plurality of sensor control points (SCPs), wherein at least one SCP is located in each local area network (LAN) segment of the enterprise network, where each LAN segment is located inside a firewall connection of the enterprise network to an external network. Each SCP comprises a first processor, a first non-transitory memory, and a plurality of sensor applications stored in the first non-transitory memory that each, when executed by the processor, analyzes data packets transmitted on the LAN segment in which the SCP is located based on criterion identified by the sensor and, responsive to a data packet satisfying the criterion, transmits a notification identifying the transmitting sensor, an identity of the source of the data packet, an identity of the destination of the data packet, and a notification reason to the cyber threat data store. The system further comprises an analytics correlation system (ACS) comprising a second processor, a second non-transitory memory, a network data traffic flow sensor application stored in the second non-transitory memory that, when executed by the processor, accesses from the network data traffic data store information on data packet traffic in the enterprise network, inside the firewall connection of the enterprise network to the external network, during a monitoring period, analyzes the data packet traffic information to determine, based on comparing the data traffic to expected values of data traffic volumes and measures of data traffic volume variabilities, an unusual data packet traffic associated with a host computer in the enterprise network, inside the firewall connection of the enterprise network to the external network, and transmits a notification comprising information about the unusual data packet traffic and an identity of the host computer associated with the unusual data packet traffic to the cyber threat data store, and a rules engine application stored in the second non-transitory memory that, when executed by the processor, analyzes a plurality of notifications identifying a first host computer, wherein the first host computer is one of the host computers in the enterprise network, inside the firewall connection of the enterprise network to the external network, based on rules configured into the rules engine application, and responsive to the analysis, one of sandboxes an application executing on the first host computer, restricts operations accessible to the application executing on the first host computer, suspends the application executing on the first host computer, or takes down the first host computer.

In another embodiment, a cyber threat attenuation system is disclosed. The system comprises a cyber threat data store, a threat list data store comprising a list of threat entries, each entry identifying an external host computer located outside of the enterprise network and metadata about the external host computer and the threat it poses, a user interface, and a plurality of sensor control points (SCPs), wherein at least one SCP is located in each local area network (LAN) segment of an enterprise network. Each SCP comprises a first processor, a first non-transitory memory, and a plurality of sensor applications stored in the first non-transitory memory that each, when executed by the processor, analyzes data packets transported by the LAN segment in which the SCP is located based on criterion identified by the sensor and, responsive to a data packet satisfying at least the criterion, transmits a notification identifying the transmitting sensor, an identity of the source of the data packet, an identity of the destination of the data packet, and a notification reason to the cyber threat data store, wherein one of the sensor applications comprises a threat listed host sensor application. The system further comprises an analytics correlation system (ACS) comprising a second processor, a second non-transitory memory, a threat list application stored in the second non-transitory memory that, when executed by the second processor, configures a threat listed host sensor application in each of the SCPs based on the entries in the threat list data store, and a rules engine application stored in the second non-transitory memory. When executed by the processor, the rules engine application analyzes a plurality of notifications identifying a first host computer including a notification from a threat listed host sensor application that identifies the first host computer as the destination for a data packet sent by or the source for a data packet sent to the host computer identified in threat list hosted sensor application that created the notification, wherein the first host computer is one of the host computers in the enterprise network, based on rules configured into the rules engine application, and responsive to the analysis, transmits an alarm to the user interface.

In an embodiment, a method of attenuating cyber threats is disclosed. The method comprises collecting by a computer system information on data packet traffic in an enterprise network during a plurality of monitoring periods and determining by the computer system an expected data packet flow rate and a measure of data packet traffic flow variability for the data packet flow rate for each of a plurality of host computers in the enterprise network based on the data packet traffic information. The method further comprises determining data packet flow rates in the enterprise network by a flow sensor application executing on the computer system and determining by the flow sensor application that a data packet flow rate of a first host computer of the plurality of host computers in the enterprise network is excessive based on the expected data packet flow rate and the measure of data packet flow rate variability associated with the first host computer. The method further comprises, in response to the excessive data packet flow rate of the first host computer, transmitting by the flow sensor application a first notification to a cyber threat data store, where the first notification comprises an identity of the flow sensor application as the sender, an identity of the first host computer, and an identity of a notification reason, reading a threat data list by a cyber threat list application executing on the computer system, where the threat data list comprises a plurality of entries, each entry identifying an external host computer located outside of the enterprise network and metadata about the external host computer and the threat it poses, and configuring a threat listed host sensor application with threat list data from a threat list data store, where the threat list data store comprises a list of threat entries, each entry identifying an external host computer located outside of the enterprise network and metadata about the external host computer and the threat it poses, wherein one of the entries identifies a first external host computer. The method further comprises determining by the threat listed host sensor application that the first external host computer sent a data packet to the first host computer or that the first host computer sent a data packet to the first external host computer; responsive to determining a data packet sent between the first external host computer and the first host computer, transmitting by the threat listed host sensor application a second notification to the cyber threat data store, where the second notification comprises an identity of the threat listed host sensor application, an identity of the first external host computer, an identity of the first computer, metadata about the first external computer and about the threat it poses, and an identification of a notification reason; analyzing the notifications identifying the first host computer by a rules engine application executing on the computer system; and based on analyzing the notifications identifying the first host computer, sending by the rules engine application an alarm to a user interface.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
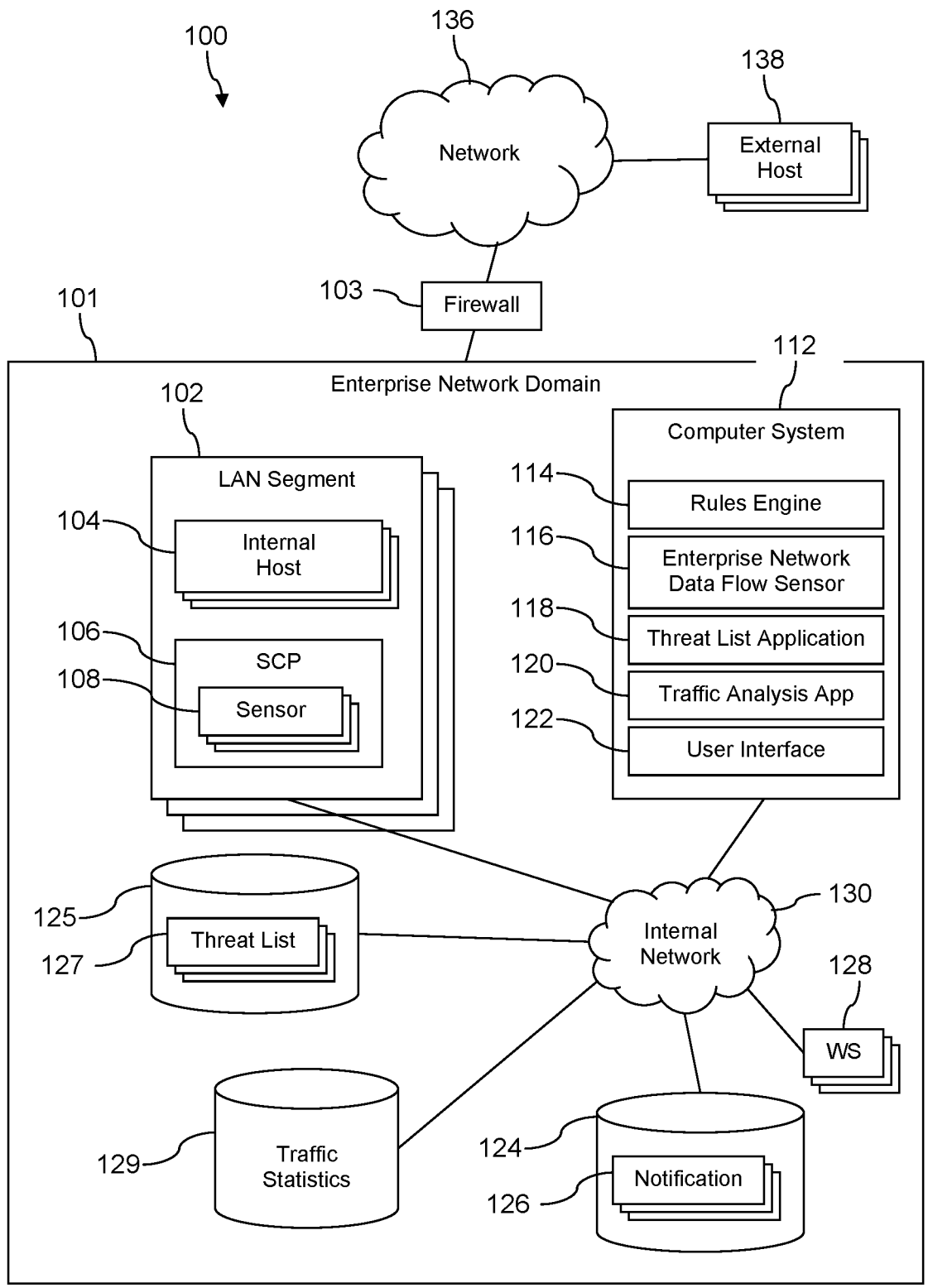
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system for detecting and responding to cyber threats and/or on-going cyber attacks that are present within the network domain of an enterprise. Throughout the disclosure it will be understood that the term cyber threat may also refer to an active or on-going cyber attack. Said in other words, the present disclosure teaches a system for detecting and responding to cyber threats that are present within the perimeter of the enterprise network domain and are present on a host computer connected to or a network node of the enterprise network domain. The system taught by the present disclosure is deployed within the enterprise network domain and is independent of any firewall device that may connect the enterprise network domain to the external network (e.g., the firewall is not part of the system). But note, the system may take action to remediate cyber threats present within the enterprise network domain, in part, by commanding the firewall to take some action, for example to block packets in-bound to the enterprise network domain that are received from a suspect external IP address. In an embodiment, the system is designed to effectively attenuate the vulnerability of the enterprise to an advanced persistent threat (APT) type of cyber threat (hereinafter referred to concisely as the APT) that is beginning to besiege cyber space. The system is also designed to detect and respond to zero-day threats, where a zero-day threat is a cyber threat that has never been seen before in its present form or has not been seen until within about the last twenty-four hours. The system is also designed to detect and respond to cyber threats of rogue users within the enterprise, for example a user that has system access credentials but is misusing them. At the same time, it is understood that the system may effectively attenuate enterprise vulnerability to other cyber threats that are not identified above.

APTs are devised to mount an attack over an extended period of time rather than to attack immediately. APTs typically operate by stealthy processes to avoid detection, with a view to continue an attack over an extended period of time. For example, an APT may infiltrate an enterprise network domain, hide itself in the enterprise network domain, collect confidential data over an extended period of time, and gradually exfiltrate (export to a host outside the enterprise network domain) the confidential data over an extended period of time. APTs typically target large enterprises, probably because the inherent complexity of large enterprise network domains can be exploited by APTs to do their work with stealth and because the rewards for successful attacks are larger. Additionally, the longer time scale and greater complexity involved may make APT attacks on low value targets uneconomical from a return on investment point of view. APTs are difficult to detect using known and conventional cyber security tools.

The system taught herein uses two or more independent processes to monitor the enterprise network domain and to generate notifications when communication events of interest are detected. Notifications may be referred to as security event reports or security event logs in some contexts. The notifications comprise information about the communication event and identify an internal host that is engaged—as a receiver or sender of a message and/or data—in the communication event. Notifications are stored in a notification data store. As new notifications are generated, a rules engine determines an internal host identified in the new notification, accesses other notifications stored in the data store that identify the same internal host, and evaluates a security status of the internal host and/or the enterprise network domain based on an analysis of what the collection of notifications may mean. For example, the rules engine may analyze the notifications to see if they fit one of a plurality of cyber attack patterns that the rules engine has been configured to identify.

The rules engine may be configured with a plurality of rules each of which is articulated to identify a general cyber attack behavior pattern (e.g., a cyber attack tactic). The rules may be created based on analysis by software developers and/or cyber threat analysts of previously observed cyber attacks. That analysis abstracts from the specific characteristics of the historical attacks to discern general tactics employed in those attacks. Countermeasures that address specific cyber threat signatures may be avoided by cyber criminals that alter the signature of a cyber attack while continuing to employ the same general tactics. By monitoring for the manifestation of general attack tactics and/or behaviors rather than specific attack signatures, the disclosed system raises the level of difficulty for cyber criminals seeking to attack an enterprise network domain, challenging them to create different tactics.

As an example, a first monitor process may determine that an internal host has sent an HTTP message that contains a hard coded IP address, where that host has not previously requested a DNS look-up that returned that IP address. The first monitor process stores a first notification in the data store identifying this event and identifying the internal host. A second monitor process may determine that the internal host has transmitted two standard deviations more data packets than the median volume of data packets that it sends during a defined period of time. The second monitor process stores a second notification in the data store identifying this event and identifying the internal host. A third monitor process may determine that a destination IP address in a data packet transmitted by the internal host is the IP address of an external host that is on a list of identified cyber threat hosts. The third monitor process stores a third notification in the data store identifying this event, identifying the internal host, and identifying the external host. When the three events are analyzed together, they are consistent with an APT executing on the internal host that collects data and transmits the data back to the host identified by the IP address that was hard coded in the HTTP message and that is identified on the list of identified cyber threat hosts.

The rules engine may analyze the first notification in isolation and not deem the information sufficient for taking action. When the second notification is generated, the rules engine is triggered to analyze the second notification in combination with the first notification. Again, the rules engine may not deem the collective information sufficient for taking action. When the third notification is generated, the rules engine is triggered to analyze the third notification in combination with the first notification and the second notification. In the context of this collection of information, the rules engine may determine that a cyber threat is likely present in the enterprise network domain. Said in other words, the rules engine may recognize that the three notifications fit a predefined pattern that associates to a cyber threat. The pattern may be a cyber crime tactic of installing a malware in an enterprise internal host that will collect confidential enterprise information and transmit that confidential information to an external host computer under the control of cyber criminals. In response to its analysis, the rules engine may generate an alarm message that it sends to a responsible security analyst for action and/or may take direct automated action itself.

The first monitoring process may comprise a plurality of sensor components or sensor applications that execute in sensor control point (SCP) servers, where at least one SCP is located in each local area network (LAN) segment of the enterprise network domain. Each sensor application may monitor for a different kind of anomalous network communication event, for example for a hard coded IP address in an HTTP message that is not associated with a preceding DNS lookup or, another example, a HTTP PUT command that is not associated with a following HTTP GET command. A sensor application may be said to detect an anomalous network communication event when an analyzed packet satisfies a criterion defined in the subject sensor application. When a sensor application detects an anomalous network communication event it may create a notification identifying the internal host or hosts that is involved in the event and an identity of the event type and store this notification in the data store.

The first monitoring process may be said to be directed to monitoring for and/or identifying cyber threat behaviors manifested in the use of communication protocols, for example by "sniffing" and/or analyzing in real-time individual data packets transported on the enterprise network domain and making inferences based on sequences of communication protocol uses. In an embodiment, an SCP may monitor sensors located in one or more network segments (where a network segment may comprise multiple LANs). Additionally, in an embodiment, an SCP may monitor sensors located in network segments in which the SCP itself is not located. It is understood that the sensor applications described herein are not "sensors" in the classical sense of a device that transduces a physical property to an electrical signal (e.g., a pressure sensor that transduces a gas pressure to an electrical analog or digital value, a temperature sensor that transduces a temperature to an electrical analog or digital value, etc.) but rather software implemented components or applications that analyze data packets such as IP datagrams, TCP datagrams, and the like.

The second monitoring process may comprise one or more applications that execute on a server computer in the enterprise domain network that analyzes statistics about network traffic sent to and from each internal host to characterize the network traffic flows statistically and compare the current data packet traffic on the enterprise domain network to customary enterprise domain network data traffic. For example, measures of customary traffic flow and metrics of variability may be determined. The measures of variability may provide a relative measure of how a current data packet traffic volume compares to customary volumes. It is contemplated that a number of different statistical analysis algorithms and statistical metrics may be used. In an embodiment, a median data traffic and standard deviation of the data traffic may be calculated and used to evaluate the data traffic. In an embodiment, a P-value may be calculated and used to evaluate the data traffic. In an embodiment, other statistical metrics may be used to measure how much a data traffic volume differs from a customary data traffic volume.

The second monitoring process may comprise a data traffic analysis application that determines expected data packet traffic volumes or flow rates and measures of data packet traffic volume or flow rate variability. The second monitoring process may further comprise an enterprise network data flow sensor that executes on the server computer that monitors the data packet traffic of each internal host and generates notifications on that traffic based on the traffic flow difference from customary traffic volumes based on a measure of variability of the traffic volumes of each internal host. The second monitoring process may be said to monitor the network behavior of internal hosts.

The third monitoring process may comprise a threat list application. A threat feed received from a source external to the enterprise domain network is stored in a threat list data store. The threat feed comprises entries or records that identify external hosts that are likely sources of cyber threats. The threat list data store entries each comprise an identity of the external host (e.g., an IP address) and other metadata that characterizes or describes the nature of the cyber threat linked to that external host. The external hosts may be listed on a black list or on a grey list, where black listed hosts are considered high probability cyber threat sources and grey listed hosts are considered medium probability cyber threat sources. Alternatively, black listed hosts may be considered to represent high severity cyber risks and grey listed hosts may be considered to represent medium severity cyber risks. The threat list application may instantiate a threat list sensor for each identified external host in the threat feed on each of the SCPs. Alternatively, the threat list application may instantiate a single threat list sensor on each of the SCPs, where the single threat list sensor is configured with the IP addresses of the black listed and grey listed external hosts. The threat list sensors monitor data traffic in the enterprise network domain, and when a data packet comprises a source address or destination address containing the IP address in the threat list sensor (e.g., a black listed or grey listed IP address), it generates a notification identifying the IP address of the threat listed external host, the identity of the internal host that is associated with the data packet, a notification identity, and stores this notification in the notification data store.

The system described in brief above can be effective at detecting and responding to APTs, zero-day threats, rogue user threats, as well as other cyber threats. The system can be said to employ a multivariate approach to detecting and responding to cyber threats, where a first variable or dimension of cyber threat information is provided by the first monitoring process, a second variable or dimension of cyber threat information is provided by the second monitoring process, and a third variable or dimension of cyber threat information is provided by the third monitoring process. The system is highly scalable and maintainable. As new cyber threat vulnerabilities are identified, new sensors can be developed and deployed to the SCPs. As new insights into the relationships among communication events are achieved and cyber threat patterns are recognized, the rules engine can be extended by adding new rules encompassing the new insights. The sensitivity of the rules to the analysis of notifications can be dialed up or down, based on the level of comfort of the enterprise and/or the level of perceived cyber vulnerability.

Turning now to FIG. 1, a system 100 is described. In an embodiment, the system 100 comprises an enterprise network domain 101, an external network 136, and a plurality of external hosts 138. The enterprise domain 101 comprises a plurality of local area network (LAN) segments 102, a cyber threat security computer system 112, a cyber threat data store 124, a threat list data store 125, a plurality of work stations (WS) 128, a network data traffic statistics data store 129, and an internal network 130. Each LAN segment 102 comprises one or more internal hosts 104 and at least one sensor control point (SCP) server 106. The internal hosts 104 are computers that are used to support the operations of the enterprise, business, government entity, or organization. These may be desktop computers, workstations, email servers, database management system servers, billing servers, printers, and other computing devices communicatively coupled to the LAN segment 102. The security computer system 112 may be referred to as an analytics correlation system (ACS) and/or a control system and user interface (CSU) in some contexts. The ACS and the CSU, which are described in more detail below, may be supported on a single physical host or server. Alternatively, the ACS and CSU may be supported on two or more physical hosts or servers. In an embodiment, some or all of the functionality of the ACS and/or the CSU may be provided using a virtual server environment, for example a cloud computing environment.

Each SCP server 106 comprises an SCP application. Each SCP 106 comprises a plurality of sensors 108. Sensors 108 monitor data traffic on the LAN segment 102 to detect anomalous communication events, to generate notifications 126 about the anomalous events, and to store the notifications 126 in the data store 124. An anomalous communication event may be any communication event that matches a predefined criterion of a sensor 108. Sensors 108 are discussed further hereinafter. The SCP application launches, monitors, and manages the sensors 108 that execute on the SCP server 106. The term SCP 106 will be used herein to refer both to the SCP server (a physical host) and to the SCP application (a software application, computer program, and/or script that executes on the SCP server).

An enterprise cyber security system taught by the present disclosure comprises the SCPs 106 with the sensors 108; the security computer system 112 with a rules engine 114, a flow sensor 116, a threat list application 118, a traffic analysis application 120, and a user interface 122; the data store 124; the threat list data store 125; the network data traffic statistics data store 129; and the WSs 128. The enterprise cyber security system operates within the enterprise network domain 101 inside of a firewall 103 that connects the enterprise network domain 101 to the external network 136. Said in other words, the firewall 103 is not part of the enterprise cyber security system taught by the present disclosure and is not considered to be "inside" the enterprise network domain 101 but instead on its periphery or even outside of the enterprise network domain 101. But note, the enterprise cyber security system may take action to remediate cyber threats present within the enterprise network domain 101, in part, by commanding the firewall 103 to take some action, for example to block packets in-bound to the enterprise network domain 101 that are received from a suspect external IP address. In some contexts, the threat list application 118 may be referred to as a cyber threat portal application.

The internal network 130 comprises electronic communication equipment within the enterprise network domain 101 that promotes communication within the enterprise network domain 101 and couples the enterprise network domain 101 to the external network 136. The internal network 130, for example, may comprise routers, switches, bridges, hubs, wireless access points, firewalls (i.e., different firewalls from the firewall 103 on the periphery of the enterprise network domain 101), and the like communication equipment. Some of the electronic communication equipment comprising the internal network 130 may be considered to be part of one or more LAN segments 102. For example, a bridge may be communicatively coupled to a first LAN segment 102 and a second LAN segment 102, e.g., to communicatively bridge the two LAN segments. Additionally, for example, a hub may be located in a LAN segment 102 to communicatively couple the LAN segment 102 together. In an embodiment, some of the communication equipment comprising the internal network 130 may comprise some security clients or security applications and hence may be considered to be, at least in part, additional components of the cyber security system.

A LAN segment is a section of a LAN separated from other LAN segments by communication equipment such as a bridge, a router, or a switch. A hub or repeater does not separate different LAN segments but instead may help to create a single LAN segment or to extend a single LAN segment. Data packets transmitted by a host on a first LAN segment need not be seen by hosts on a second LAN segment separated from the first LAN segment by a bridge, switch, or router (e.g., when the bridge, switch, or router does not pass these data packets to the second LAN segment). By contrast data packets transmitted by a host on the first LAN segment are generally seen by all other hosts on the first LAN segment. LAN segmentation may improve the efficiency of data communication in an enterprise network domain by reducing packet collisions. LAN segmentation may also provide enhanced security under some conditions.

The cyber threat security computer system 112 may be referred to by other names, for example an analytics and correlation system (ACS) and/or a control system and user interface (CSU). In an embodiment the functions of the cyber threat security computer system 112 may be provided on two or more computers. The computer system 112 comprises a rules engine 114, an enterprise network data flow sensor 116, a threat list application 118, a network data packet traffic analysis application 120, and a user interface 122. The user interface 122 may provide a front-end or interface for the WSs 128 that are used by cyber threat analysts in the enterprise to monitor the security of the enterprise network domain 101, to review notifications 126, to receive alarms from the rules engine 114, and to administer the cyber security elements of the enterprise network domain 101. The WSs 128 may be used to configure elements of the cyber threat security computer system 112, for example severities of alarms, priorities of handling alarms, and other aspects. In an embodiment, the WSs 128 may present a web page linked to the user interface 122 that provides an interface to the security system.

In an embodiment, the rules may be stored in the rules engine 114. Alternatively, in an embodiment, the rules may be stored in a file or data structure external to the rules engine 114, and the rules engine 114 may read the file or data structure periodically or when it is triggered to analyze notifications 126 in the light of a newly created notification 126.

It is understood that in an embodiment, the components 114, 116, 118, 120, 122 may be partitioned into more components or combined into two or fewer components. For example, in an embodiment, the rules engine 114 and the threat list application 118 may be combined in a single application. Alternatively, the rules engine 114 may be partitioned into two or more components and/or the threat list application 118 may be partitioned into two or more components. Additionally, the computer system 112 may execute other components, not shown, that provide other centralized cyber security processing.

The sensors 108 are separate applications or executable software components. Each sensor 108 is of a particular sensor type that is configured to sense a specific type of network communication event. Said in other words, the sensors 108 are configured with one or more criterion that is used to analyze data packets and/or data traffic on the LAN segments 102 and/or the enterprise network domain 101. Some of the sensors 108 may identify specific communication protocol message sequences and detect message sequences that manifest probable malicious communication behaviors or tactics. When such a message sequence is detected, the sensor 108 sends a notification 126 to the data store 124. It is noted that a notification does not mean that a cyber threat is present or that a cyber attack is underway. A notification may be thought of as being a clue or a puzzle piece. The notification may mean nothing and may be insignificant on its own. When analyzed in the context of other notifications, however, the notification may contribute to the recognition of a pattern of events that betoken a cyber threat or cyber attack.

In an embodiment, the sensors 108 may comprise sensors from a plurality of the following sensor types and other sensor types not described herein. In an embodiment, the functionality of the sensors 108 may be categorized into (1) sensing time to live values in excess of a threshold, (2) sensing specific sequences or state transitions, (3) sensing sizes of data communication in excess of a threshold, (4) sensing predefined port numbers or ranges of port numbers, and (5) sensing predefined names or suffixes. Some individual sensors 108 may provide two of more of the functionalities identified above, for example different functionalities used to analyze communications based on a common protocol. In an embodiment, the sensors 108 may be categorized into (1) sensors operating at the network layer, (2) sensors operating at the transport layer, and (3) sensors operating at communication layers above the transport layer.

In an embodiment, the sensors 108 may be categorized into (1) sensors that detect communication events related to a target phase of a cyber threat, (2) sensors that detect communication events related to a reconnaissance phase of a cyber threat, (3) sensors that detect communication events related to a compromise phase of a cyber threat, (4) sensors that detect communication events related to a lateral pivot phase of a cyber threat, (5) sensors that detect communication events related to a collection phase of a cyber threat, and (6) sensors that detect communication events related to an exfiltration phase of a cyber threat. Some of the sensors 108 may provide functionality that interacts with communication events related to a plurality of the cyber threat phases identified above.

A file transfer sensor is configured to examine file transfer communication events and to generate notifications if file transfer rules implemented by the sensor are violated. File transfer rules may be defined independently for each of a plurality of different file transfer events and may relate to file size, file types, file names. Different file transfer events may comprise HTTP_GET, HTTP_POST, HTTP_PUT, FTP_GET, SMTP, SMB_READ, and SMB_WRITE. Some rules may trigger generation of a notification when a file request results in a "file not found" reply message, for example a FTP error 550 or a SMB "file not found."

A TCP (transport control protocol) misuse sensor is configured to monitor TCP messages and to generate notifications when anomalous TCP message patterns are detected. If a TCP session does not terminate within a predefined time period (e.g., within a 2 hour time limit), the TCP misuse sensor may create an associated notification. If a TCP connect attempt receives no reply, the TCP misuse sensor may create an associated notification.

A stateful HTTP (hypertext transfer protocol) transaction sensor is configured to detect anomalous HTTP message sequences and to generate an associated notification. For example, typically a HTTP POST request to a target host is preceded by a corresponding HTTP GET to the same target host. If a HTTP POST is detected that cannot be linked to a corresponding preceding HTTP GET, the stateful HTTP transaction sensor creates an associated notification. As another example, if more than one HTTP POST is sent without an intermediate HTTP GET, the stateful HTTP transaction sensor creates an associated notification.

An ICMP (Internet Control Message Protocol) misuse sensor is configured to monitor use of the ICMP protocol and to generate notifications when anomalous ICMP use is detected. Misuse of the ICMP protocol may be associated with various cyber crime reconnaissance activities, for example host detection and network topology discovery, access control list (ACL) detection, and protocol/port scanning. The ICMP misuse sensor may monitor ICMP traffic to detect ICMP packets that exceed a predefined size threshold, to detect ICMP packets of predefined disallowed types, to detect ICMP packets having a predefined combination of type and code, and to detect ICMP packets that comprise a time to live (TTL) value that violates a predefined value range. Typical TTL values may be in the range of seconds, for example 10 seconds or 30 seconds. A TTL value in an ICMP message in the range of hours, then, would be anomalous. In the event of any of these ICMP communication events being detected, the ICMP misuse sensor may create an associated notification.

An ARP (address resolution protocol) misuse sensor is configured to monitor use of the ARP protocol and to generate notifications when anomalous ARP use is detected. Misuse of the ARP protocol may be associated with an attempt to program a switch in the enterprise network domain 101 in conjunction with a man-in-the-middle cyber attack. The ARP misuse sensor monitors volumes of ARP inbound and outbound requests and responses. Rates in excess of predefined thresholds are deemed anomalous by the ARP misuse sensor, and the ARP misuse sensor creates a notification when it detects an excess ARP volume.

A UDP (user datagram protocol) misuse sensor is configured to monitor use of the UDP protocol and to generate notifications when anomalous UDP use is detected. The UDP misuse sensor may generate notifications when a UDP message is sent or received by an internal host that identifies a port number less than 1024 (a privileged port) or that is directed to an external subnet. In an embodiment, the UDP misuse sensor sends a notification if the communication protocol associated with the UDP message is inconsistent with the port number but does not send a notification if the communication protocol and port number are consistent (e.g., an FTP access on well known port 20 is consistent and a SNTP access on well known port 25 is consistent).

A DNS (domain name system) misuse sensor is configured to monitor use of the DNS functionality and to generate notifications when anomalous DNS use is detected. Misuse of the DNS function may be associated with a command and control cyber threat behavior and/or an exfiltration cyber threat behavior. The DNS misuse sensor may create notifications when it detects a DNS resolution request for a fully qualified domain name (FQDN) that is identified as a disallowed DNS name in a predefined list, when it detects a DNS resolution request for a FQDN that contains more than one 64-byte component, when it detects a DNS resolution request for a FQND that has more than 4 components, when it detects a DNS resolution request that has an anomalous TTL (e.g., a TTL that is unusually long), and when it detects a DNS response that returns an excessive amount of data when compared to a predefined threshold.

In an embodiment, the DNS misuse sensor (or another sensor or other software component) may monitor establishment of new IP network flows (e.g., establishment of a socket directly to an IP address). When a new IP network flow is detected, the DNS misuse sensor determines whether the new connection was preceded by a corresponding DNS lookup. When DNS lookups are conducted, the results may be stored in a DNS cache in the enterprise network domain 101. If there is not a corresponding DNS result in the DNS cache, the DNS misuse sensor may generate a notification. It has been observed that under some test conditions a high percentage of malware opens sockets to an IP address without first performing a DNS lookup.

An IP (Internet protocol) connection scanning sensor is configured to monitor IP packets to analyze whether scanning is being attempted using either TCP (transmission control protocol) or UDP (universal datagram protocol) packets. The IP connection scanning sensor tracks inbound and outbound failed connection attempts and ICMP destination unreachable error packets as a strategy for identifying a port scanning activity. The IP connection scanning sensor may generate a notification if the number of failed connection attempts from a single internal host is greater than a predefined threshold. In an embodiment, the connection attempt threshold may be defined relative to a time interval, for example failed connection attempts per minute, per hour, per day, or some other time interval. Some legitimate tools that may execute on internal hosts 104 or communication equipment in the internal network 130, for example nmap or network monitors, may use techniques that look like port scanning. It is contemplated that the IP connection scanning sensor may be configured with a list of internal hosts 104 and/or communication equipment in the internal network 130 that are authorized to perform port scanning and to suppress notification creation by the IP connection scanning sensor for those listed internal hosts 104 and communication equipment.

An IP header analysis sensor is configured to monitor internal hosts connecting to or being connected from one of a predefined list of ports and generates a notification when such a connection occurs. The predefined list of ports may be associated with an elevated frequency of cyber attacks.

An SMB (server message block) misuse sensor is configured to monitor SMB communication events in the enterprise network domain 101 and to generate a notification when high risk SMB messaging patterns are detected by the sensor. SMB is a protocol that may be used for providing shared access to files, printers, and serial ports. Sometimes the SMB protocol may be exploited to distribute malware. As an example, detection of an SMB create request file message comprising multiple .lnk files may be used by the SMB misuse sensor as a trigger for generating a notification.

A RDP (remote desktop protocol) misuse sensor is configured to monitor RDP communication events in the enterprise network domain 101 and to generate a notification when high risk RDP messaging patterns are detected by the sensor. RDP is a protocol that provides an interface to connect to another computer over a network connection.

Notifications 126 may be created by sensors 108 and sent to the data store 124. Notifications 126 are not typically sent to individual users, cyber analysts, or WSs 128 (notwithstanding, a mode of the WS 128 may provide a functionality for accessing and presenting notifications 126 in response to received user input to the WS 128). It is observed that generation of a notification 126, by itself, does not indicate that a cyber attack is in progress or that an internal host 104 has been compromised. A notification 126 may be thought of as a clue or puzzle piece. A notification 126 is an observation of a communication event that desirably is interpreted in the context of other notifications 126 and possibly other information not captured in notifications 126. A pattern of notifications 126 that does imply a cyber attack or a compromised internal host 104 may be identified by the rules engine 114 that accordingly may generate an alarm and/or take automated action to attenuate the threat.

Notifications 126 may be of different types, depending on the source of the notification 126 (e.g., what sensor 108 generated the notification 126) and/or depending on the communication event that resulted in generation of the notification 126. The structures and/or information content of notifications 126 can vary based on type. Notifications 126 comprise an identification of the notification type and a unique identification of the specific notification instance (i.e., two different instances of the same notification type would have different names or identifiers). Notifications 126 comprise an identity of at least one internal host 104 that was engaged with the communication event that resulted in generation of the subject notification 126. In some cases, a notification 126 may comprise identities of two or more internal hosts 104, for example when a first internal host 104 sends a data message to a second internal host 104 or a plurality of internal hosts 104 (e.g., a broadcast data message). Some notifications 126 comprise an identity of at least one external host 138. Host identities may be articulated by IP addresses, MAC addresses, and/or by domain names and/or by other identification values.

Some notifications 126 may comprise additional supporting information. For example, a notification 126 may comprise information identifying sizes, counts, port numbers, time to live values that are deemed dubious or anomalous by the sensor 108 that generated the notification 126. For example, a notification 126 may comprise metadata about an external host 138 identified by the threat list application 118 as discussed further hereinafter.

In an embodiment, at least one sensor 108 of each of the different sensor types identified above executes on at least one SCP 106 in every LAN segment 102. Said in other words, in an embodiment, every LAN segment 102 is monitored by (1) a file transfer sensor, (2) a TCP misuse sensor, (3) a stateful HTTP transaction sensor, (4) an ICMP misuse sensor, (5) an ARP misuse sensor, (6) a UDP misuse sensor, (7) a DNS misuse sensor, (8) an IP connection scanning sensor, (9) an IP header analysis sensor, (10) an SMB misuse sensor, and (11) a RDP misuse sensor. Further, it is contemplated that every LAN segment 102 may be monitored by other sensors 108 of different sensor types, as new strategies for identifying potential anomalous communication events in the enterprise network domain 101 are determined. In an embodiment, every LAN segment 102 is monitored by at least four of the identified different types of sensors 108. In an embodiment, every LAN segment 102 is monitored by at least three of the identified different types of sensors 108. In an embodiment, every LAN segment 102 is monitored by at least six of the identified different types of sensors 108.

In an embodiment, the SCPs 106 may execute on or be communicatively coupled to a test access point (TAP) and/or a switch port analyzer (SPAN) in its corresponding LAN segment 102. The SCP 106 (i.e., the SCP application) launches sensors 108. The SCP 106 may monitor and restart sensors 108 that terminate. The SCPs 106 and/or sensors 108 may be said to passively monitor network traffic on its corresponding LAN segment 102. In some contexts, the monitoring of the enterprise network domain 101 and generation of notifications 126 by the sensors 108 may be referred to as enterprise network domain traffic monitoring or net traffic monitoring.

The sensors 108 may provide LAN segment data traffic information to the SCP application or a dedicated data traffic information collection application. The data traffic information may be collected in a variety of different bins or collectors. The data traffic information may be collected in a different bin or collector for each host on the LAN segment 102. The data traffic information may be collected in a different bin or collector for each different host interface (a single host may have a plurality of host interfaces) on the LAN segment 102. The data traffic information may be collected in a different bin or collector for each different communication protocol and for each different host or host interface. The SCP 106 periodically transmits the data traffic information to the network data traffic statistics data store 129, for example in the form of summaries or counts of data traffic events. The SCP 106 may transmit the data traffic information to the traffic statistics data store 129 about every 30 seconds, about every minute, about every five minutes, about every ten minutes, about every fifteen minutes, about every twenty minutes, or some other period of time.

The traffic analysis application 120 may execute on the security computer system 112 and analyzes the data traffic information sent to the traffics statistics data store 129 by the SCPs 106. The traffic analysis application 120 processes the statistics to determine expected traffic volumes or traffic flows and to determine measures of traffic volume or traffic flow variability, dispersion, scatter, or spread. The expected traffic volumes may be analyzed according to various statistical algorithms. The expected traffic volumes may be expressed as median values, average values, or in another form. The measure of traffic volume variability may be expressed as standard deviations, P-values, interquartile range, or in another form. The expected value and measure of variability may be determined separately for every host interface and every communication protocol (i.e., a first expected value, a first measure of variability for a first host interface for a first communication protocol; a second expected value, a second measure of variability for the first host interface for a second communication protocol). For example, different expected values and measures of variability for a host interface may be determined for each of TCP traffic, UDP traffic, HTTP traffic, DNS traffic, ARP traffic, FTP traffic, and ICMP traffic on that host interface. In an embodiment, the expected value and measure of variability may be calculated for each of a plurality of different times of day and/or days of the week. Thus, the first expected value and the first measure of variability may apply for the first host interface for the first communication protocol for noon on a weekday but a second expected value and a second measure of variability may apply for the first host interface for the first communication protocol for 4 PM on a weekday.

The enterprise network data flow sensor 116 may execute on the security computer system 112. The flow sensor 116 monitors data packet traffic volumes in the enterprise network domain 101 by analyzing the data traffic information transmitted to the traffic statistics data store 129 by the SCPs 106 and comparing that current information to the statistical expected traffic volumes and measures of traffic volume variability determined by the traffic analysis application 120. The enterprise network data flow sensor 116 generates notifications when a traffic flow exceeds a predefined threshold, for example varies from the expected traffic volume by more than a predefined number of calculated variability. For example, a notification may be generated if a traffic volume of a host interface for a given communication protocol exceeds the corresponding expected value by more than 1.5 standard deviations or 0.02 P-values or 0.05 P-values. In some embodiments, automated analysis of traffic flow volumes may be performed using linear regression and/or naïve Bayes techniques.

Over time, the traffic volume statistical metrics (i.e., expected traffic volumes and measures of variability) may be recalculated or adapted based on rolling windows of time bins. Over time the communication behavior of an internal host 104 or communication equipment may change—increase or decrease gradually—and thus it is contemplated that the traffic statistics and distributions will adjust correspondingly.

The flow sensor 116 may compare observed data traffic volume to statistical metrics in a number of different ways, in addition to the direct comparison to an expected data traffic volume based on a measure of variability. The ratio of transmitted data to received data on the host interface for the subject communication protocol may be compared to a median or normal ratio of transmitted to received data for the subject host interface for the subject communication protocol. The ratio of the number of transmit data flow instances to the number of receive data flow instances on the host interface for the subject communication protocol may be compared to a median or normal ratio of transmit data flow instances to receive data flow instances for the host interface for the subject communication protocol. The traffic analysis application 120 may calculate the expected ratios and measures of variability of the ratios.

The threat list data store 125 is updated periodically and/or asynchronously with a threat feed from an external source, for example daily, weekly, and/or monthly. The threat feed comprises entries identifying external hosts 138 that are associated with cyber threats. The information in the threat feed may be organized into a threat list 127 in the threat list data store 125. The entries in the threat list 127 may identify the external hosts 138 by IP address and/or by domain name. The entries may further comprise metadata describing various aspects or information about the subject external host 138. For example, the metadata may describe a presumed threat that the external host 138 is deemed to have promulgated or be compromised by. The metadata may comprise a narrative of a cyber attack that has been perpetrated, at least in part, by the external host 138. The metadata may comprise an identification of a geographical location of an origin or source of the associated cyber threat (e.g., location of an origin or a source of malware) and/or of a geographical location of the black listed or grey listed host computer. The metadata may comprise an identification of an industry sector that is targeted by the associated cyber threat. The metadata may comprise identification of systems, software, firmware, and/or applications that are targeted by the associated cyber threat. The metadata may comprise identification of a date of the threat data and/or an expiration date of the threat data.

The external hosts 138 may be listed on a black list or on a grey list, where black listed hosts are considered high probability cyber threat sources and grey listed hosts are considered medium probability cyber threat sources. Notwithstanding, however, the black lists and grey list may be expected to contain "false positives"—hosts that are not really compromised hosts may be contained in the lists. Alternatively, black listed hosts may be considered to represent high severity cyber risks and grey listed hosts may be considered to represent medium severity cyber risks.

The threat list application 118 may instantiate a threat list sensor for each identified external host on the threat list 127 in the threat list data store 125 on each of the SCPs 106. The threat list sensors may have an expiration time such that they terminate themselves after a predetermined time duration, for example a default time duration or a time duration specified in the metadata of the associated threat list entry. A time to live of a threat list sensor may be reset when a new threat feed is received and the subject external host 138 is still included in the refreshed threat list 127. The threat list application 118 may refresh the time to live of threat list sensors when the threat feed is received by the threat list data store 125 and the associated external hosts 138 are still included in the thread feed.

Alternatively, the threat list application 118 may instantiate a single threat list sensor on each of the SCPs 106, where the single threat list sensor is configured with the IP addresses of the black listed and grey listed external hosts. In an embodiment, each black listed or grey listed external host configured in the threat list sensor may have a time to live value that is updated by the threat list application 118 when the threat feed is received by the threat list data store 125. When the time to live of a black listed or grey listed host expires, the subject host may be removed from the threat sensor host list. Alternatively, if a notification 126 would otherwise be made in response to observed data packet traffic related to a black listed or grey listed host but the time to live of that host has expired, the notification 126 is not created and not sent.

The threat list sensors monitor data traffic in the enterprise network domain 101, and when a data packet comprises a source address or destination address containing the IP address in the threat list sensor (e.g., a black listed or grey listed IP address), it generates a notification 126 identifying the IP address of the threat listed external host 138, the identity of the internal host 104 that is associated with the data packet, a notification identity, and stores this notification 126 in the data store 124. In an embodiment, the notification 126 generated by the threat list sensor may further comprise the metadata associated with the associated threat list entry.

The rules engine 114 analyzes the notifications 126 stored in the data store 124 to identify a plurality of notifications 126 that conform to a predefined pattern indicative of a cyber threat or a malware presence in the enterprise network domain 101. The creation and storing of a new notification 126 in the data store 124 may trigger the rules engine 114 to read the new notification 126, determine at least one internal host 104 associated with the notification 126, search the data store 124 for all other notifications 126 that are associated with the same internal host(s) 104, and analyze these notifications collectively in light of predefined criteria.

The rules engine 114 may execute a plurality of rules or criterion checks against a set of notifications 126 associated with an internal host 104, and if any criterion check or rule is satisfied, the rules engine 114 takes an automated action. The action may be creating an alarm and sending the alarm to one or more responsible parties, for example a responsible cyber analyst or security administrator. In an embodiment, the alarms comprise a severity level from 1 to 5, where 5 represents the highest severity (most dangerous or highest risk) cyber threat. In another embodiment, the alarms comprise a severity level from 1 to 3. In another embodiment, the alarms comprise a severity level from 1 to 10. In another embodiment, a different scale of alarm severity may be employed. In an embodiment, alarms may also comprise a priority, for example a priority in which alarms may be automatically processed by alarm handling applications or scripts. Alarms may comprise the identities of or links to the notifications 126 the analysis of which triggered the rules engine 114 to generate the alarm. Alarms may comprise the identities and/or IP addresses of internal hosts 104 and/or communication equipment that are associated with the notifications 126 analysis of which triggered the rules engine 114 to generate the alarm. The WS 128 may be used to review the content of the alarm, for example to review the notifications 126 that associate to the alarm.

Other actions that the rules engine 114 may take may comprise sandboxing an application executing on an internal host 104 or communication equipment, restricting the operations accessible to the subject internal host 104 or communication equipment (e.g., restrict transmission of data packets to the external network 136 and/or to one of the external hosts 138), suspending the application executing on the internal host 104 or communication equipment, or taking down the internal host 104 or communication equipment. Sandboxing refers to executing an application or software program in a controlled and/or restricted environment, to reduce the potential for the application or program to inflict harm on the internal host 104, the LAN segment 102, and/or the enterprise network domain 101. Sandboxing may be enforced by an operating system of the internal host 104 and may prevent the application executing in the sandbox from reading or writing to the LAN segment 102 and/or the enterprise network domain 101 or to read from or write to host interfaces of the internal host 104. Sandboxing may be a temporary action to allow cyber analysts time to determine whether the subject application is compromised and/or poses a cyber threat to the internal host 104, the LAN segment 106, and/or the enterprise network domain 101. Taking down the internal host 104 may mean disabling its host interfaces to the LAN segment 102 and/or to the enterprise network domain 101. Alternatively, taking down the internal host 104 may mean shutting the host down and/or removing power to the host.

In some circumstances, the rules engine 114 may be triggered to analyze the notifications 126 associated with a particular internal host 104 on the event that a new notification 126 identifying the internal host 104 is generated and stored in the data store 124. It is noted that the sensors 108, the threat sensors, and the flow sensor 116 may monitor the communication equipment comprising the internal network 130 as well as the internal hosts 104 and generate notifications about those communication equipment items also.

The rules engine 114 may generate an alarm when an internal host 104 or item of communication equipment uses a communication protocol that it is not expected to use, for example when a printer originates an FTP transmission or originates an HTTP GET request. A plurality of rules may be defined for the rules engine 114 identifying unlikely communication events for specific internal hosts 104 based on a narrowly circumscribed function performed by the internal host 104. The expected functional roles of some of the internal hosts 104 may be defined and stored in the data store 124. For example, an email server role may be defined for a first internal host 104, a printing role may be defined for a second internal host 104, a human resources database management system role may be defined for a third internal host 104, a customer billing function may be defined for a fourth internal host 104, and so on.

Some examples of cyber threat detection scenarios are described below to promote better appreciating the workings of the enterprise security system. An HTTP message is transmitted by an internal host 104 that is determined by a sensor 108 to contain a hard coded IP address and further that the transmission of the HTTP message was not preceded by a DNS lookup that returned the hard coded, encapsulated IP address. A notification 126 identifying this internal host 104, the hard coded IP address, and the identity of the anomalous communication event (HTTP message encapsulating a hard coded IP address when the IP address had not previously been resolved by an associated DNS lookup response) is created and stored in the data store 124. In response to the new notification 126, the rules engine 114 searches the data store 124 for other notifications 126 associated with the subject internal host 104 but finds none.

At a later time, the flow sensor 116 detects an increased volume of outbound data traffic from the internal host 104. For example, the outbound TCP traffic of the internal host 104 is a standard deviation above the median outbound TCP traffic for the TCP protocol on the subject host interface of the internal host 104. A corresponding notification 126 identifying this internal host 104, the address of the destination of outbound TCP transmission, and the identity of the anomalous communication event is created and stored in the data store 124. In response to the new notification 126, the rules engine searches the data store 124 for other notifications 126 and finds the notification recording the communication event of the HTTP message encapsulating the hard coded IP address. The rules engine 114 determines that the hard coded IP address is the same address as the destination address associated with the new notification 126. This might be sufficient to generate an alarm, but for purposes of example let it be supposed these two notifications are not determined to be alarmable.

At a yet later time, an updated threat list is received by the threat list application 118 and a new IP address of an external host 138 is present in the black list. A new threat list sensor is instantiated in each of the LAN segments 102 (or the single threat list sensor in each LAN segment 102 is updated with the black listed IP address). Another outbound TCP packet is detected by the threat list sensor for being addressed to a black listed IP address of an external host 138, in fact the recently identified as black listed external host. A notification 126 is created indicating the internal host 104, the IP address of the external host 138, and the black listed transmission event, and the notification 126 is stored in the data store 124. In response to the new notification 126, the rules engine 114 reviews the two earlier notifications 126 related to the subject internal host 104 in the light of the new notification 126. In the context of the information contained in the three notifications—each from a different variable or dimension of the security system (i.e., from the network traffic monitoring dimension, from the network behavior analysis dimension, and from the threat list dimension)—the rules engine 114 determines that the notifications 126 match a threat pattern defined in one of its rules and generates an appropriate alarm and/or takes an appropriate corrective action, such as suspending the application executing on the internal host 104.

As another example, Jane is the CEO at Acme Widgets and uses her laptop computer for business analytics and correspondence. Her laptop is running a suite of office software applications, has a firewall enabled, runs anti-virus software, and sits on the enterprise network domain joined to Acme's Active Directory Domain Services (AD DS). Acme uses firewalls, intrusion detection systems (IDSes), and sandboxing technology to weed out malicious attacks. The anti-virus software on her laptop does a full signature-based scan for malware every day at 2:00 AM.

While at the office, Jane receives an e-mail addressed directly to her that purports to be from a shareholder requesting the latest 10-Q filing. Attached to the e-mail is a standardized document format file that, unbeknownst to Jane, carries a malicious trojan horse that uses a document reader vulnerability to install itself on her laptop. The malicious code itself, a BADBOY variant, is rather old, but it has been modified to avoid detection by current anti-virus products. BADBOY.v successfully installs and becomes reboot-persistent through registry key entries. BADBOY.v performs the following tasks: (1) downloads additional components directly from IP a.b.c.d; (2) installs these components on Jane's laptop, one of which is a key logger; (3) directly connects to IP f.g.h.k for Command and Control; and (4) exfiltrates all key-logged information to IP m.n.p.q in an encrypted format In the two weeks between the installation of BADBOY.v on Jane's laptop and the development by the anti-virus development company of a BADBOY v signature for use in extirpating the new variant of BADBOY, the BADBOY.v installed on Jane's laptop has attempted to reach out to the above seeded address, but the enterprise security system disclosed above has detected these attempts, has determined that they are direct requests to IP addresses without prior name resolution, and has sandboxed those requests. The Acme incident response team determines that Jane's laptop computer is infected, finds the malicious file, and restores Jane's laptop from image.

Figure 2:
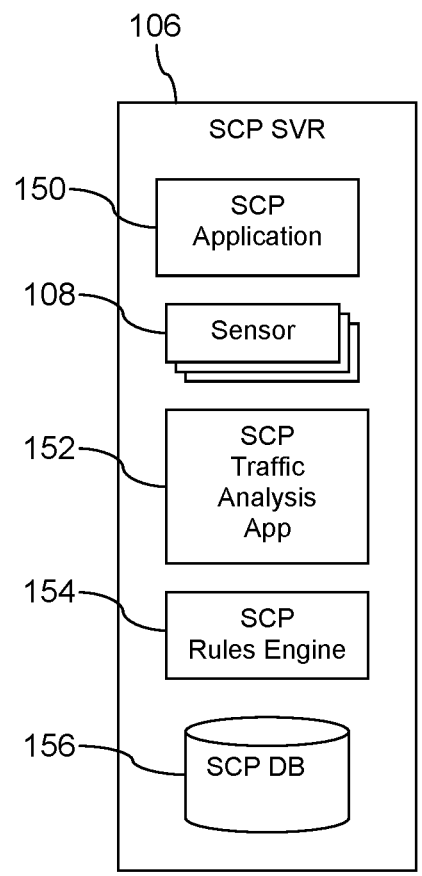
FIG. 2 is a block diagram of a sensor control point (SCP) server according to an embodiment of the disclosure.

Turning now to FIG. 2, details of the SCP server 106 are described. In an embodiment the SCP server 106 comprises an SCP application 150, as previously mentioned above. The SCP server 106 further comprises the sensors 108 as described above. In an embodiment, the SCP server 106 comprises an SCP traffic analysis application 152 and an SCP data store 156.

The SCP traffic analysis application 152 may receive LAN segment data traffic information from the sensors 108 and accumulate counts of data traffic in a plurality of bins or collectors in the SCP data store 156. The SCP traffic analysis application 152 may perform some statistical analysis on the data traffic, for example calculating derived values based on the raw accumulated counts. These may include ratios of transmitted to received data packets and other ratios. In an embodiment, the SCP traffic analysis application 152 may be configured with expected traffic volume values and measures of traffic volume variability by the traffic analysis application 120 executing on the computer system 112. The SCP traffic analysis application 152 may evaluate current traffic volumes relative to the configured expected traffic volumes and measures of traffic volume variability and generate notifications 126 (when traffic varies by more than a predefined number of units of the measure of variability from the configured expected traffic volume value) that are transmitted to the cyber threat data store 124. This alternative approach to comparing current traffic flows to expected traffic volume and measures of traffic volume variability by the traffic analysis application 120 executing on the computer system 112 may reduce the processing load on the computer system 112 and promote more rapid identification of network data traffic anomalies.

The SCP traffic analysis application 152 forwards traffic data to be stored in the traffic statistics data store 129. This traffic data may be in the form of raw counts in bins or collectors. Alternatively, the traffic data sent to the traffic statistics data store 129 may comprise summaries and/or derived values. In an embodiment, the SCP server 106 further comprises an SCP rules engine 154 that may monitor notifications generated by the sensors 108 and generate further notifications based thereupon. Additionally, the SCP rules engine 154 may provide some pre-processing of some of the notifications output by the sensors 108 before they are transmitted up to the cyber security data store 124. The SCP rules engine 154 may provide a single notification that subsumes the information or the context of multiple notifications generated by individual sensors 108.

Figure 3A:
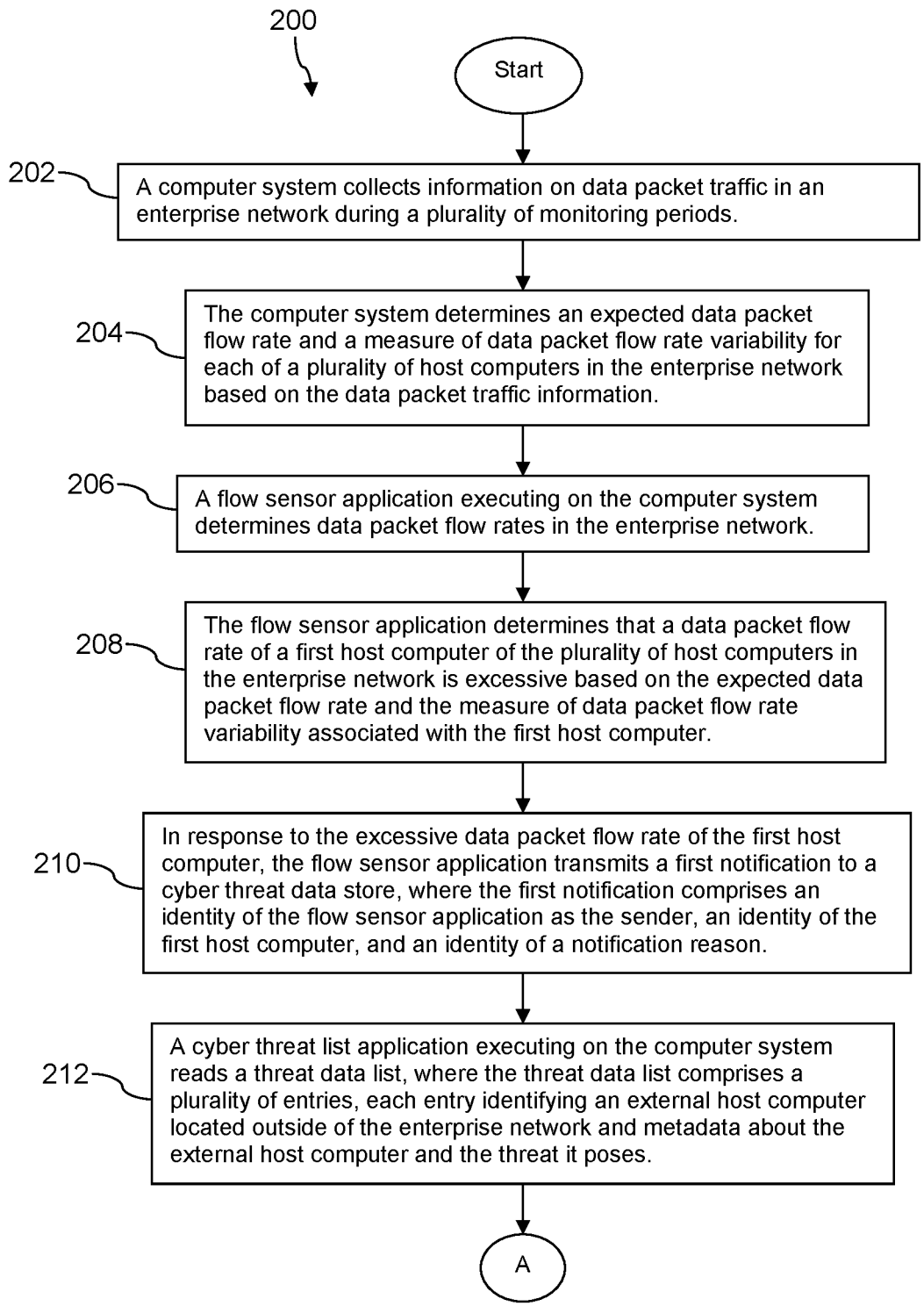
FIG. 3A and FIG. 3B is a flow chart of a method according to an embodiment of the disclosure.
Figure 3B:
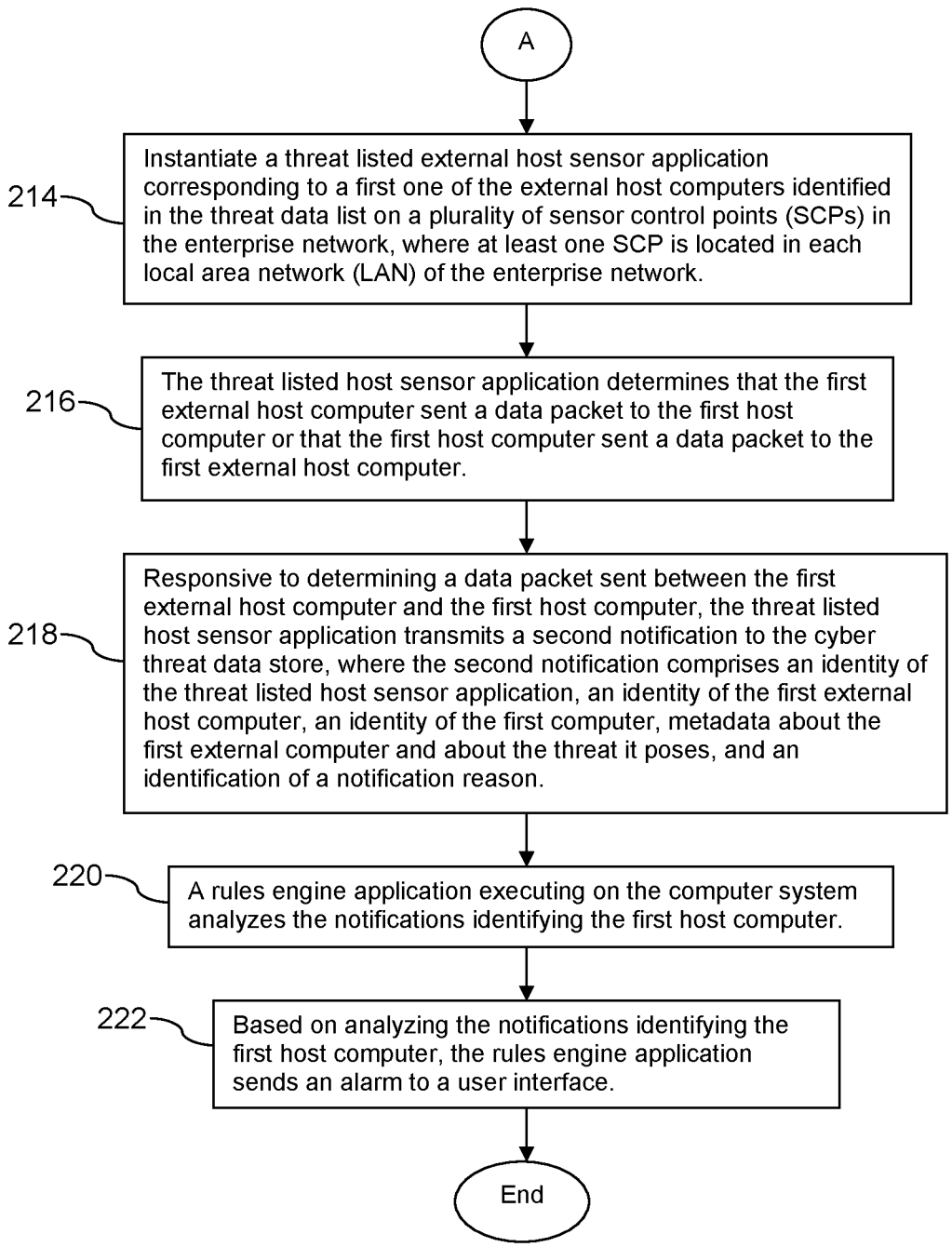

Turning now to FIG. 3A and FIG. 3B, a method 200 is described. At block 202, a computer system collects information on data packet traffic in an enterprise network during a plurality of monitoring periods. For example, the enterprise network data flow sensor 116 collects information from each of the host interfaces of the internal hosts 104 and the communication equipment composing the internal network 130. In an embodiment, the information indicates what communication protocols are used. At block 204, the computer system determines an expected data packet flow rate and a measure for the data packet flow rate variability for each of a plurality of host computers in the enterprise network based on the data packet traffic information. In an embodiment, the computer system determines an expected data packet flow rate and a measure of data packet flow rate variability for each of the host interfaces for each different communication protocol used by the host interface for each of the internal hosts 104 and the communication equipment composing the internal network 130. In an embodiment, the expected values and measures of variability are calculated independently for each of a plurality of different time periods, for example hourly, daily, and/or weekly.

At block 206, a flow sensor application executing on the computer system determines data packet flow rates in the enterprise network. At block 208, the flow sensor application determines that a data packet flow rate of a first host computer of the plurality of host computers in the enterprise network is excessive based on the expected data packet flow rate and the measure of the data packet flow rate variability associated with the first host computer. In an embodiment, the determination is made based on comparison between the observed current data packet flow rate to an expected data packet flow rate defined for a like period of time. In an embodiment, the determination is made by comparing the data packet flow rate of a first host interface of the first host computer to a corresponding expected data packet flow rate and measure of data packet flow rate variability determined for the first host interface of the first host computer. In an embodiment, the determination is made by comparing the data packet flow rate of the first host computer during a specific period of time to a corresponding expected value of and measure of variability of data packet flow rate for the first host computer determined for the corresponding period of time. In an embodiment, the determination is made by comparing the data packet flow rate of the first host computer of a specific communication protocol to a corresponding expected value and measure of variability of data packet flow rate of the same specific communication protocol determined for the first host computer.

At block 210, in response to the excessive data packet flow rate of the first host computer, the flow sensor application transmits a first notification to a cyber threat data store (e.g., data store 124), where the first notification comprises an identity of the flow sensor application as the sender, an identity of the first host computer, and an identity of a notification reason. At block 212, a cyber threat list application executing on the computer system reads a threat data list (e.g., reads the threat list data from the threat list data store 125), where the threat data list comprises a plurality of entries, each entry identifying an external host computer located outside of the enterprise network and metadata about the external host computer and the threat it poses. At block 214, configure a threat listed host sensor application with threat list data from a threat list data store, where the threat list data store comprises a list of threat entries, each entry identifying an external host computer located outside of the enterprise network and metadata about the external host computer and the threat it poses, wherein one of the entries identifies a first external host computer;

At block 216, the threat listed host sensor application determines that the first external host computer sent a data packet to the first host computer or that the first host computer sent a data packet to the first external host computer. At block 218, responsive to determining a data packet sent between the first external host computer and the first host computer, the threat listed host sensor application transmits a second notification to the cyber threat data store, where the second notification comprises an identity of the threat listed host sensor application, an identity of the first external host computer, an identity of the first computer, metadata about the first external computer and about the threat it poses, and an identification of a notification reason.

At block 220, a rules engine application executing on the computer system analyzes the notifications identifying the first host computer. At block 222, based on analyzing the notifications identifying the first host computer, the rules engine application sends an alarm to a user interface. In an embodiment, the rules engine application may further take automated action to attenuate the cyber threat, for example sandboxing an application executing on the first host computer, suspending execution of the application executing on the first host computer, or shutting down the first host computer.

Figure 4:
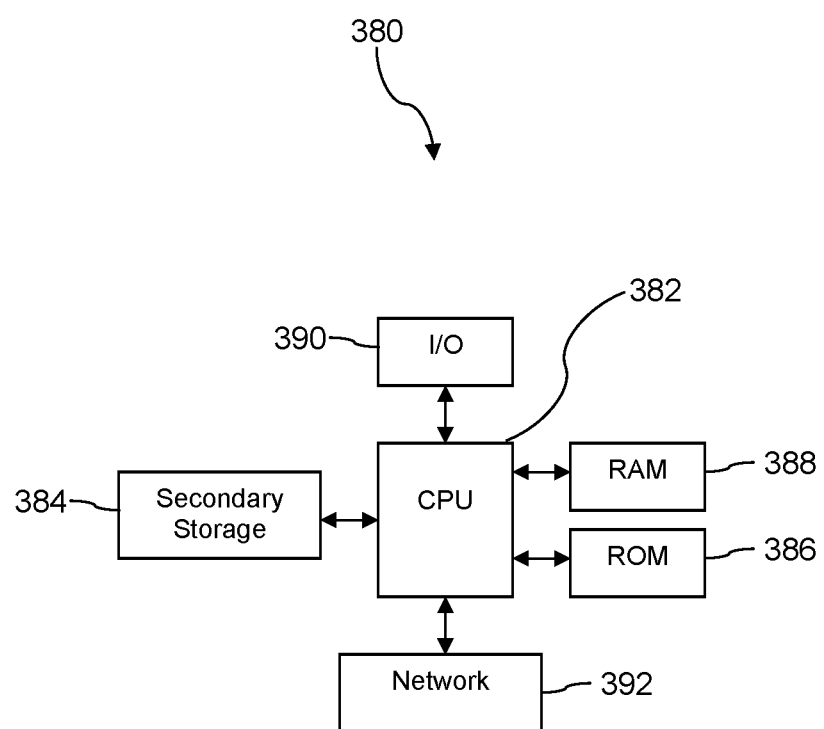
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A cyber threat attenuation system, comprising:
a cyber threat data store;
a network data traffic data store that stores expected values of data traffic volumes and measures of data traffic volume variabilities for a plurality of host computers in a plurality of LAN segments of an enterprise network and stores host data traffic volume information;
a user interface;
one or more sensor control points (SCPs), wherein at least one SCP is located in each local area network (LAN) segment of the enterprise network, where each LAN segment is located inside a firewall connection of the enterprise network to an external network, and wherein each SCP comprises:
a first processor,
a first non-transitory memory, and
a plurality of sensor applications stored in the first non-transitory memory that each, when executed by the first processor,
analyzes data packets transmitted on the LAN segment in which the SCP is located,
based on at least one criterion identified by the sensor application,
responsive to a data packet satisfying the at least one criterion, transmits a notification identifying the sensor application as a transmitting sensor, an identity of the source of the data packet, an identity of the destination of the data packet, and a notification reason to the cyber threat data store, and
collects and transmits the host data traffic volume information to the network data traffic data store; and
an analytics correlation system (ACS) comprising:
a second processor,
a second non-transitory memory,
a data traffic analysis application stored in the second non-transitory memory that, when executed by the second processor,
analyzes the host data traffic volume information for each of a plurality of different communication protocols for each of the plurality of host computers, and
based on the analysis, determines different expected values of data traffic volume for each of the plurality of host computers for each of the plurality of different communication protocols and different measures of data traffic volume variability for each of the plurality of host computers for each of the plurality of different communication protocols,
a network data traffic flow sensor application stored in the second non-transitory memory that, when executed by the second processor,
accesses from the network data traffic data store information on data packet traffic in the enterprise network, inside the firewall connection of the enterprise network to the external network, during a monitoring period,
analyzes the data packet traffic information with respect to the different expected values of data traffic volume for each of the plurality of host computers for each of the plurality of different communication protocols and the different measures of data traffic volume variability for each of the plurality of host computers for each of the plurality of different communication protocols,
based on the analysis of the data packet traffic information, identifies an unusual data packet traffic associated with a host computer of the plurality of host computers by determining that a data traffic volume of the host computer for a communication protocol of the plurality of different communication protocol exceeds a corresponding expected value of data traffic volume on the host computer for the communication protocol, and
in response to the determination that the data traffic volume of the host computer for the communication protocol exceeds the corresponding expected value of data traffic volume on the host computer for the communication protocol, transmits a notification comprising information about the unusual data packet traffic and an identity of the host computer associated with the unusual data packet traffic to the cyber threat data store,
a rules engine application stored in the second non-transitory memory that, when executed by the second processor,
analyzes, based on rules configured into the rules engine application, a plurality of notifications from the network data traffic flow sensor application on the ACS a and one or more of the plurality of SCPs identifying a first host computer, wherein the first host computer is one of the plurality of host computers in the enterprise network, inside the firewall connection of the enterprise network to the external network, and
responsive to the analysis, takes an action with respect to the first host computer.

2. The cyber threat attenuation system of claim 1, wherein the data traffic analysis application analyzes the host data traffic volume information for each of a plurality of different time intervals for each of the plurality of host computers to determine different expected values of data traffic volume for each of the plurality of host computers and different measures of data traffic volume variability for each of the plurality of host computers for each of the different time intervals.

3. The cyber threat attenuation system of claim 1, wherein the plurality of sensor applications comprise at least one sensor application that senses time to live values in excess of a threshold, at least one sensor application that senses specific sequences of state transitions, at least one sensor application that senses sizes of data communication in excess of a threshold, at least one sensor application that senses predefined port numbers, and at least one sensor application that senses predefined names.

4. The cyber threat attenuation system of claim 1, wherein the plurality of sensor applications comprise at least one sensor application that analyzes data packets at a network layer, at least one sensor application that analyzes data packets at a transport layer, and at least one sensor application that analyses data packets at a communication layer above the transport layer.

5. The cyber threat attenuation system of claim 1, wherein one of the plurality of sensor applications is configured to generate a notification when the first host computer sends a data packet to an IP address outside of the enterprise network when the first host computer has not previously received a DNS lookup response comprising the IP address that is outside of the enterprise network.

6. The cyber threat attenuation system of claim 1, wherein the action comprises at least one of sandboxing an application executing on the first host computer, restricting operations accessible to the application executing on the first host computer, suspending the application executing on the first host computer, taking down the first host computer, or transmitting an alarm to a user interface.

7. A method of attenuating cyber threats, comprising:
for each of a plurality of sensor applications stored in a non-transitory memory of a sensor control point (SCP) located in local area network (LAN) segments of an enterprise network inside a firewall connection of the enterprise network to an external network, analyzing, by each sensor application, data packets transmitted on the LAN segment based on at least one criterion identified by the sensor application;
responsive to a data packet satisfying the at least one criterion, transmitting, by the sensor application, a first notification identifying the sensor application as a transmitting sensor, an identity of the source of the data packet, an identity of the destination of the data packet, and a notification reason to a cyber threat data store;
collecting and transmitting, by each sensor application, host data traffic volume information to a network data traffic data store;
analyzing, by a data traffic analysis application executing on computer system, the host data traffic volume information for each of a plurality of different communication protocols for each of a plurality of host computers;
based on the analysis, determining, by the data traffic analysis application, different expected values of data traffic volume for each of the plurality of host computers for each of the plurality of different communication protocols and different measures of data traffic volume variability for each of the plurality of host computers for each of the plurality of different communication protocols;
accessing, by a network data traffic flow sensor application executing on the computer system from the network data traffic data store, information on data packet traffic in the enterprise network, inside the firewall connection of the enterprise network to the external network, during a monitoring period;
analyzing, by the network data traffic flow sensor application, the data packet traffic information with respect to the different expected values of data traffic volume for each of the plurality of host computers for each of the plurality of different communication protocols and the different measures of data traffic volume variability for each of the plurality of host computers for each of the plurality of different communication protocols;
based on the analysis of the data packet traffic information, identifying, by the network data traffic flow sensor application, an unusual data packet traffic associated with a host computer of the plurality of host computers by determining that a data traffic volume of the host computer for a communication protocol of the plurality of different communication protocol exceeds a corresponding expected value of data traffic volume on the host computer for the communication protocol;
in response to the determination that the data traffic volume of the host computer for the communication protocol exceeds the corresponding expected value of data traffic volume on the host computer for the communication protocol, transmitting, by the network data traffic flow sensor application, a notification comprising information about the unusual data packet traffic and an identity of the host computer associated with the unusual data packet traffic to the cyber threat data store;
analyzing, by a rules engine application executing on the computer system based on rules configured into the rules engine application, a plurality of notifications from the network data traffic flow sensor application and the SCP identifying a first host computer in the enterprise network, inside the firewall connection of the enterprise network to the external network; and
responsive to the analysis, taking, by the rules engine application, an action with respect to the first host computer.

8. The method of claim 7, further comprising:
analyzing, by the data traffic analysis application, the host data traffic volume information for each of a plurality of different time intervals for each of the plurality of host computers to determine different expected values of data traffic volume for each of the plurality of host computers and different measures of data traffic volume variability for each of the plurality of host computers for each of the different time intervals; and
determining, by the network data traffic flow sensor application, unusual data packet traffic associated with one or more of the plurality of host computers for each of the plurality of different time intervals.

9. The method of claim 7, wherein the plurality of sensor applications comprise at least one sensor application that senses time to live values in excess of a threshold, at least one sensor application that senses specific sequences of state transitions, at least one sensor application that senses sizes of data communication in excess of a threshold, at least one sensor application that senses predefined port numbers, and at least one sensor application that senses predefined names.

10. The method of claim 7, wherein the action comprises at least one of sandboxing an application executing on the first host computer, restricting operations accessible to the application executing on the first host computer, suspending the application executing on the first host computer, taking down the first host computer, or transmitting an alarm to a user interface.

11. A method of attenuating cyber threats, comprising:
collecting, by a computer system, information on data packet traffic in an enterprise network during a plurality of monitoring periods;
analyzing, by the computer system, the data packet traffic information for each of a plurality of different communication protocols for each of a plurality of host computers;
based on the analysis, determining, by the computer system, different expected data packet flow rates for each of the plurality of host computers for each of the plurality of different communication protocols and different measures of data packet traffic flow variability for the data packet flow rate for each of the plurality of host computers for each of the plurality of different communication protocols;

determining, by a flow sensor application executing on the computer system, data packet flow rates for each of the plurality of host computers for each of the plurality of different communication protocols in the enterprise network;

determining, by the flow sensor application, that a data packet flow rate of a first host computer of the plurality of host computers in the enterprise network for a communication protocol of the plurality of different communication protocols is excessive by determining that a data packet flow rate of the first host computer for the communication protocol of the plurality of different communication protocols exceeds a corresponding expected data packet flow rate on the first host computer for the communication protocol;

in response to the excessive data packet flow rate of the first host computer for the communication protocol, transmitting, by the flow sensor application, a first notification to a cyber threat data store, where the first notification comprises an identity of the flow sensor application as a sender of the first notification, an identity of the first host computer, and an identity of a notification reason;

reading, by a cyber threat list application executing the computer system, a threat data list, where the threat data list comprises a plurality of entries, each entry identifying an external host computer located outside of the enterprise network and metadata about the external host computer and the threat it poses;

configuring a threat listed host sensor application with threat list data from a threat list data store, where the threat list data store comprises a list of threat entries, each entry identifying an external host computer located outside of the enterprise network and metadata about the external host computer and the threat it poses, wherein one of the entries identifies a first external host computer;

determining, by the threat listed host sensor application, that the first external host computer sent a first data packet to the first host computer or that the first host computer sent a second data packet to the first external host computer;

responsive to determining that the first data packet or the second data packet has been sent between the first external host computer and the first host computer, transmitting, by the threat listed host sensor application, a second notification to the cyber threat data store, where the second notification comprises an identity of the threat listed host sensor application, an identity of the first external host computer, an identity of the first computer, metadata about the first external computer and about the threat it poses, and an identification of a notification reason;

sensing, by a sensor application executing in a local area network (LAN) segment of the enterprise network, an anomalous communication protocol usage by the first host computer, where the first host computer is located in the LAN segment;

in response to sensing the anomalous communication protocol usage, transmitting, by the sensor application, a fifth notification to the cyber threat data store;

analyzing, by a rules engine application executing on the computer system, a plurality of notifications from the flow sensor application and the threat listed host sensor application identifying the first host computer including the first notification and the second notification; and based on analyzing the plurality of notifications identifying the first host computer, taking, by the rules engine application, an action with respect to the first host computer.

12. The method of claim 11, further comprising:
determining, by the computer system, an expected ratio of data packets transmitted to data packets received for each of the plurality of host computers in the enterprise network based on the data packet traffic information;
determining, by the flow sensor application, that a ratio of data packets transmitted to data packets received of the first host computer is excessive based on the expected ratio of data packets transmitted to data packets received for the first host computer; and
in response to the excessive ratio of data packets transmitted to data packets received of the first host computer, transmitting, by the flow sensor application, a fourth notification to the cyber threat data store, where the fourth notification comprises the identity of the flow sensor application as a sender of the fourth notification, the identity of the first host computer, and an identity of a notification reason.

13. The method of claim 11, further comprising:
determining, by the computer system, an expected ratio of number of transmit data flow instances to a number of receive data flow instances for each of the plurality of host computers in the enterprise network based on the data packet traffic information;
determining, by the flow sensor application, that a ratio of a number of transmit data flow instances to a number of receive data flow instances of the first host computer is excessive based on the expected ratio of the number of transmit data flow instances to the number of receive data flow instances of the first host computer; and
in response to the excessive ratio of a number of transmit data flow instances to a number of receive data flow instances of the first host computer, transmitting, by the flow sensor application, a fifth notification to the cyber threat data store, where the fifth notification comprises the identity of the flow sensor application as a sender of the fifth notification, the identity of the first host computer, and an identity of a notification reason.

14. The method of claim 11, wherein the anomalous communication protocol usage comprises transmitting by the first host computer a data packet to an IP address outside of the enterprise network without first having received a domain name system (DNS) response containing the IP address or transmitting by the first host computer a HTTP POST message to a target host that is not preceded by a corresponding HTTP GET message sent to the target host by the first host computer.

15. The method of claim 11, wherein the action comprises at least one of sandboxing an application executing on the first host computer, restricting operations accessible to the application executing on the first host computer, suspending the application executing on the first host computer, taking down the first host computer, or transmitting an alarm to a user interface.

16. The cyber threat attenuation system of claim 1, wherein at least some of the ACS is provided using a cloud computing environment.

17. The cyber threat attenuation system of claim 1, wherein the first processor and the second processor are the same processor.

18. The cyber threat attenuation system of claim 1, wherein the first non-transitory memory and the second non-transitory memory are the same non-transitory memory.

* * * * *